April 10, 1956  J. C. HAIRE  2,741,080
SUBMARINE GROWTH CUTTER
Filed Nov. 20, 1952  2 Sheets-Sheet 1

John C. Haire
INVENTOR.

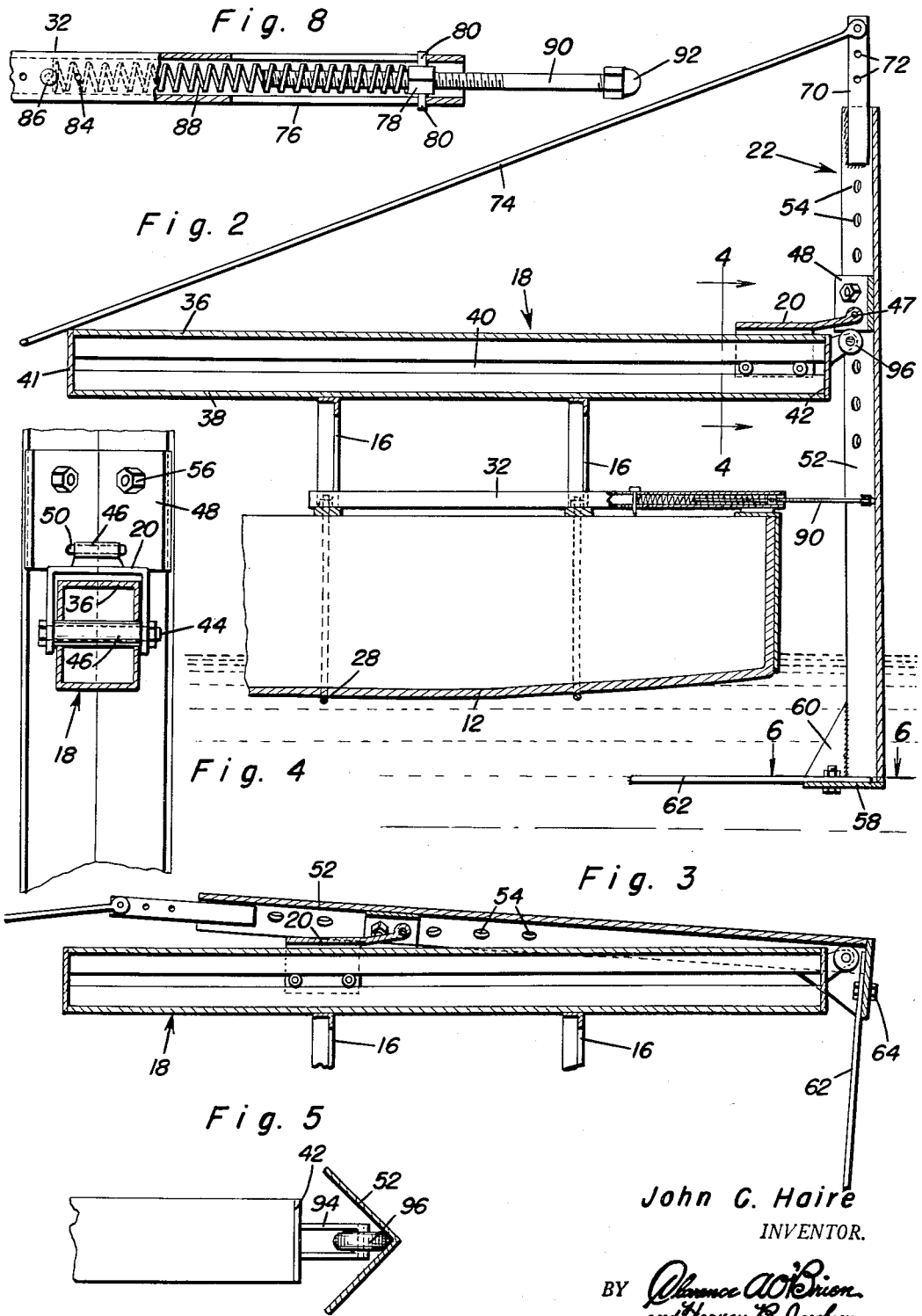

United States Patent Office 2,741,080
Patented Apr. 10, 1956

2,741,080

SUBMARINE GROWTH CUTTER

John C. Haire, Arp, Tex.

Application November 20, 1952, Serial No. 321,710

8 Claims. (Cl. 56—8)

The present invention relates to submarine growth cutters.

A primary object of the invention is to provide an underwater growth cutter that may be quickly mounted and dismounted from a boat and which includes a novel track, carriage and cutter bar arrangement for raising and lowering the cutter assembly from and to its growth cutting positions.

A further object of the present invention is to provide a submarine growth cutter including a novel means for yieldingly adjusting the angle at which the cutting blades are disposed under the water when in growth cutting position.

Yet another object of the present invention is to provide a boat-mounted underwater growth cutting apparatus in which the cutting elements are vertically adjustable and wherein the cutter bar assembly may be moved into and out of growth engaging positions with a minimum of friction.

These, together with various ancillary objects and features which will later become apparent as the following description proceeds, are attained by this invention, a preferred embodiment of which is shown, by way of example, in the accompanying drawings, wherein:

Figure 2 is a side elevational view in section of the submarine growth cutter with the cutter bar assembly being shown in operative position;

Figure 3 is a side sectional view of the cutter bar assembly per se with parts being broken away;

Figure 4 is a cross-sectional view in enlarged scale of the track and carriage arrangement of the cutter taken substantially along section line 4—4 of Figure 2;

Figure 5 is a top sectional view of the rolling contact of the cutter bar with the forward end of the track;

Figure 8 is a side view in enlarged scale, partially in section, of the means for holding the cutter bar assembly yieldingly in angularly adjustable position.

Figure 1:
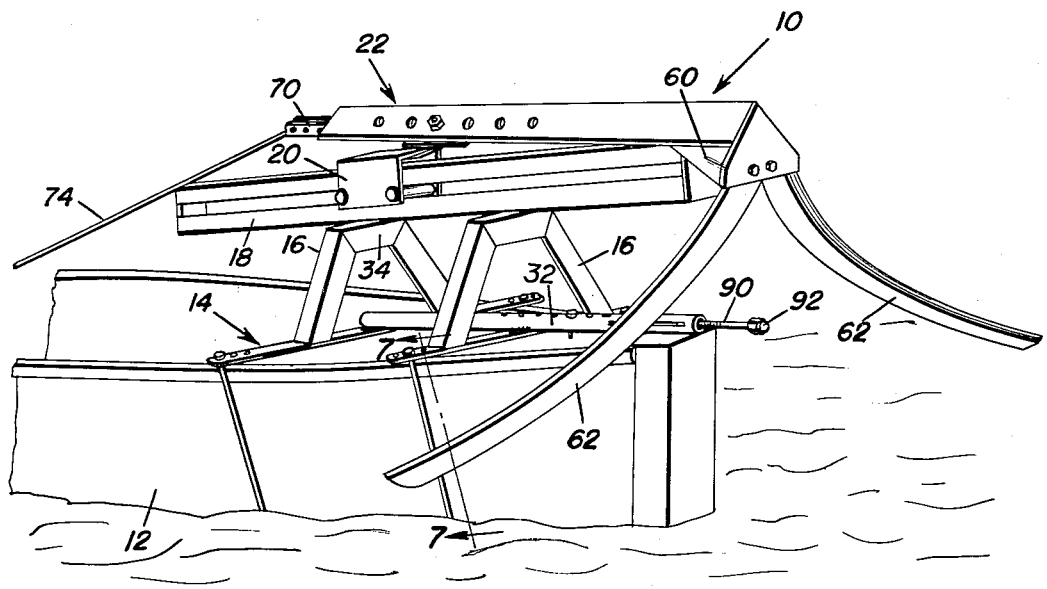
Figure 1 is a perspective view of the submarine growth cutter mounted on a boat with the cutter assembly being shown in inoperative position.
Figure 7:
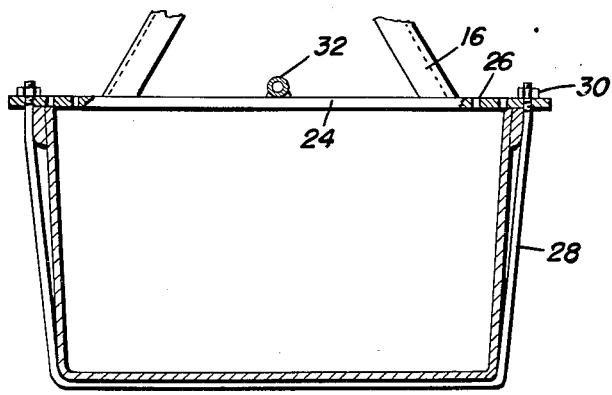
Figure 7 is a cross-sectional view of the boat showing the mounting of the cutter thereon.
Figure 6:
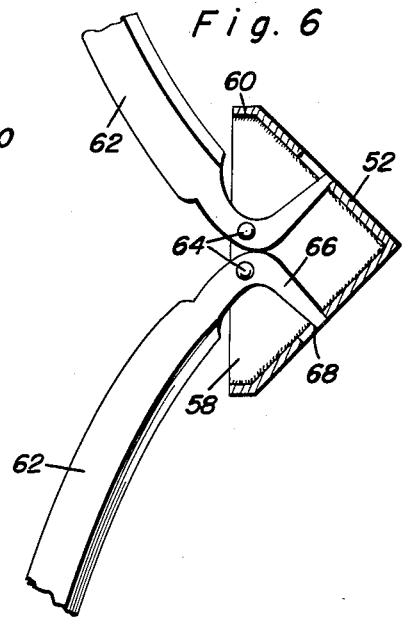
Figure 6 is a cross-sectional view in enlarged scale of the attachment of the cutting blades taken substantially along section line 6—6 of Figure 2.

Referring now to the accompanying drawings in detail, wherein like reference numerals are used to designate similar parts throughout the various views, the submarine growth cutter, or lily pad cutter, is designated in its entirety by the numeral 10 and is shown being mounted on the bow end of a boat 12.

The submarine growth cutter 10 comprises generally a base 14, mounting brackets 16, track 18, carriage 20 and cutter bar assembly 22.

The base 14 consists of a pair of spaced, flat straps or bars 24, the ends of which are adapted to rest upon the gunwales of the boat 12. Adjacent the ends of the bars 24 apertures 26 are provided in longitudinally spaced relation to one another. U-bolts 28 embrace the hull of the boat 12 and have their ends projected through selected of the apertures 26 and secured thereto by means of fasteners 30. To maintain the bars 24 in spaced relation to one another, a tube 32 extends between the bars 24 and is welded to the central portion of each bar. It will be noted that the tube 32 projects forwardly beyond the front bar 24 to a point adjacent the bow of the boat 12.

U-shaped mounting brackets 16 are secured at the free ends of their legs to the bars 24 so that the webs 34 of the brackets are disposed above and parallel to the bars 24. The track 18 is rigidly mounted on the mounting brackets 16 in substantially parallel relation to the base rod or tube 32. The track 18 comprises a box beam formed from a pair of channels 36 and 38, respectively. The channels 36 and 38 are spaced from one another to provide a central slot or trackway 40 therebetween. To maintain the channels in their spaced relation, close the ends of the box beam and provide stop means for the carriage 20, spacer plates 41 and 42 are provided at the rearward and forward ends of the track 18.

The carriage 20 comprises a U-shaped plate having its web overlying the web of the upper channel 36 and its legs straddling the legs of the channel 36 and depending below the trackway or guide slot 40. Bolts 44 extend through the guide slots 40 and join the free ends of the legs of the carriage 20 to one another. Rollers 46 are journaled on the bolts 44 for rolling movement along the guide slot 40. The forward end of the web of the carriage 20 projects forwardly from the balance of the carriage and has an eye 46. A pintle hanger 48 is swingably mounted on the carriage by virtue of the pivot pin 50, which forms a part of or is attached to the hanger, being rotatably disposed in the eye 46.

The cutter bar assembly 22 consists of an elongated angle iron constituting a standard. The standard 52 has a plurality of longitudinally spaced apertures 54 intermediate its ends which are adapted to selectively align or register with apertures in the hanger 48. Suitable fasteners 56 secure the standard 52 to the hanger 48. At the lower or forward end of the standard 52 is secured a base plate 58 which is additionally held in place by means of the gussets 60. Arcuate cutter or sickle blades 62 are secured to the base plate 58 by means of pins or other suitable fasteners 64. To assure a rigid attachment of the arcuate blades 62 to the standard 52, the inner ends of the blades 62 are provided with tongues which extend into suitable apertures 68 in the standard 52. A rigid strap 70 is secured to and extends above the upper end of the standard 52 and has a plurality of longitudinally spaced apertures 72 therein, through a selected one of which extends a fastener for securing the eye of an actuating rod or cable 74 thereto.

Referring now most particularly to Figures 2 and 8, the construction and utility of the tube 32 forming a portion of the base 14 will be readily observed. Adjacent the forward end of the tube 32, the tube is provided with a pair of parallel, diametrically opposed slots 76. An operating nut 78 is disposed concentrically within the forward end of the tube 32 and has radially projecting legs 80 extending into the diametrically opposed slots 76 in the tube 32. Thus, the nut 78 is mounted within the tube 32 for longitudinally sliding movement within the tube 32. Rearwardly of the slots 76, the tube 32 is further provided with a plurality of axially spaced, diametrically opposed openings 84. Through a selected pair of these diametrically opposed openings 84, a pin 86 is passed. A compression spring 88 disposed within the tube 32 has one end seated against the pin 86 and the other end against the operating nut 78 whereby the nut 78 is urged yieldingly to its forwardmost position within the tube 32. Obviously, by means of the axially spaced apertures 84, the yielding force exerted by the spring 88 against the nut 78 may be varied. Further, it is to be noted that the side walls of the slots 76 by their engagement with the radially projecting arms 80 of the nut 78 prevent rotational movement of the nut 78 and permit only longitudinally sliding movement theerof. A rod 90 is threaded on the nut 78 and projects forwardly from the forward end of the tube 32. A head 92 is fixed to the forwardly projecting end of the rod 90 and forms an abutment or stop for the cutter bar 52 of the assembly 22. By adjusting the distance with which the rod 90 is threaded into the tube 32, the angle at which the cutter bar 52 depends from the track 18 may be varied.

At the forward end of the track 18, mounted on the plate 42 by means of bracket arms 94 is a roller or castor 96 over which the standard 52 may rollingly ride as it pivots about the carriage 20.

Figure 9:
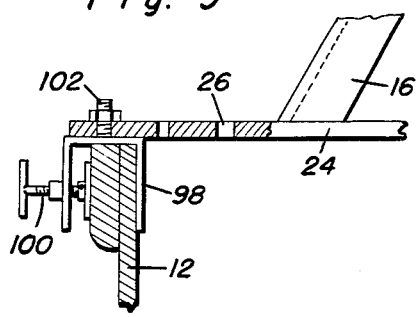
Figure 9 is a detail view, partially in section, of a slightly modified means for mounting the cutter on a boat.

In Figure 9, a slightly modified mounting means for the base 14 of the device is shown. In this construction, the bars 24 are provided with depending hangers 98 at each end thereof which straddle the gunwales of the boat. Clamping screws 100 extending through one of the legs of the hanger 98 clamps the hanger securely against the gunwale of the boat 12. Threaded lug 102 extending upwardly from the web of the hanger 98 passes through an aperture 26 in the bar 24 to secure the hanger 98 thereto.

The operation of the device is easily understood. Referring first to Figure 2, wherein the submarine growth cutter 10 is shown in operative position, it will be seen that the carriage 20 is substantially at the full limit of its forward movement along the track 18. At this position, by virtue of its pivotal attachment to the carriage 20, the cutter bar assembly 22 is disposed in a substantially vertical position with the cutter blades 62 being disposed beneath the surface of the water. To change the depth of the cutter blades 62 in the water, it is only necessary to change the mounting of the standard 52 on the hanger 48 by means of the adjustment apertures. By virtue of the rolling engagement of the carriage 20 within the guide slot 40 and the rolling engagement of the cutter bar 52 with the castor 96, no sliding friction is encountered in the path of movement of the cutter bar assembly from its inoperative to operative positions.

When it is desired to change the cutting angle of the cutter blades 62, it is only necessary to change the distance with which the stop rod 90 projects from the forward end of the tube 32. If a finer angular adjustment is necessary, obviously the compressive strength of the spring 88 may be greatened or lessened by changing the position of the pin 86. By virtue of the mounting of the nut 78 within the tube 32 and the action of the spring 88, when the cutter blades 62 engages an object which it is impossible for them to cut, they will yieldingly engage such object and give the operator of the assembly ample opportunity to back off from the object or raise the assembly 22 and thereby prevent permanent damage to the cutter blades 62. Also, when the submarine growth is too thick for cutting by a steady push on the cutter blades 62, the device may be adapted to perform a chopping operation. By rowing the boat into the growth to the extent that the nut 78 is pressed to its rearmost position within the tube 32 and then pulling suddenly on the actuating rod or cable 74, the cutter bar assembly 22 may be rocked in a highly advantageous chopping action.

From the foregoing description, the construction and operation of the invention are believed to be apparent. However, since numerous modifications and changes will readily occur to those skilled in the art after a consideration of the foregoing specification taken in conjunction with the accompanying drawings, it is not desired to limit the invention to the exact construction shown and described. But, all suitable modifications may be resorted to which fall within the scope of the appended claims.

What is claimed as new is as follows:

1. A submarine growth cutter comprising a base adapted for mounting on a boat, a carriage track mounted on said base, a carriage slidably mounted on said track, a standard hingedly secured to said carriage for swinging movement about an axis transverse to said standard in response to movement of said carriage, cutter blades mounted on one end of said standard, said standard being adapted to swing about said carriage and depend at an angle to the track from one end of said carriage, and means carried by said base for yieldingly maintaining said standard against movement beyond a predetermined angle in one direction with respect to the track.

2. A submarine growth cutter comprising a base, bracket means on said base, a track mounted on said bracket means, a carriage slidably mounted on said track, a cutter bar assembly, means hingedly securing said assembly to said carriage for swinging movement about one end of said track in response to movement of said carriage, and adjustable stop means on said base for limiting the swinging movement of said cutter bar assembly.

3. A submarine growth cutter comprising a base, bracket means on said base, a track mounted on said bracket means, a carriage slidably mounted on said track, a cutter bar assembly, means hingedly securing said assembly to said carriage for swinging movement about one end of said track in response to movement of the carriage, and stop means on said base for limiting the swinging movement of said cutter bar assembly in one direction, said stop means being adjustable, said base including a pair of spaced parallel straps, said stop means including a tube extending between and secured to said straps.

4. A submarine growth cutter comprising a base, bracket means on said base, a track mounted on said bracket means, a carriage slidably mounted on said track, a cutter bar assembly, means hingedly securing said assembly to said carriage for swinging movement about one end of said track in response to movement of the carriage, stop means on said base for limiting the swinging movement of said cutter bar assembly in one direction, said stop means being adjustable, said stop means including a tube, said tube having an operating nut slidably disposed therein, means on said tube engaging said nut at longitudinally spaced points to limit the sliding movement of the nut, and a rod threadedly received in said nut, one end of said rod projecting exteriorly of said tube and engaging said cutter bar assembly.

5. A submarine growth cutter comprising a base, a bracket means on said base, a track mounted on said bracket means, a carriage slidably mounted on said track, a cutter bar assembly, means hingedly securing said assembly to said carriage for swinging movement about one end of said track in response to movement of the carriage, stop means on said base for limiting the swinging movement of said cutter bar assembly in one direction, said stop means being adjustable, said stop means including a tube, said tube having an operating nut slidably disposed therein, means on said tube engaging said nut at longitudinally spaced points to limit the sliding movement of the nut, a rod threadedly received in said nut, one end of said rod projecting exteriorly of said tube and engaging said cutter bar assembly, and resilient means in said tube urging said nut in one direction.

6. A submarine growth cutter for boats comprising a base, means for mounting said base on a boat, an elongated track carried by said base, carriage means slidably carried by said track, a standard swingably carried by said carriage and having a portion thereof engaging one end of the track for swinging movement in response to movement of the carriage, cutter blades carried by said standard, and adjustable stop means disposed beneath said track and engageable with said standard for yieldingly maintaining said standard against movement beyond a predetermined angle with respect to said track.

7. The submarine growth cutter of claim 6 wherein said means for mounting said base on a boat include hangers adapted to be attached to the gunwale of the boat, and means securing said hangers to said base.

8. The submarine growth cutter of claim 6 wherein said means for mounting said base on a boat include a U-bolt adapted to embrace the hull of the boat and having outer ends, and means securing said U-bolt outer ends to said base.

References Cited in the file of this patent

UNITED STATES PATENTS

| | | |
|---|---|---|
| 1,269,139 | Welch | June 11, 1918 |
| 1,344,626 | Ellis | June 29, 1920 |
| 2,403,365 | Hilblom | July 2, 1946 |
| 2,482,530 | Wurtele | Sept. 20, 1949 |
| 2,588,004 | Holmes | Mar. 4, 1952 |
| 2,608,043 | Berdan | Aug. 26, 1952 |

FOREIGN PATENTS

| | | |
|---|---|---|
| 348,922 | Germany | Feb. 21, 1922 |
| 661,848 | France | Mar. 11, 1929 |
| 747,694 | France | Apr. 4, 1933 |
| 768,990 | France | May 28, 1934 |